(12) United States Patent
Kulkarni et al.

(10) Patent No.: US 11,764,710 B2
(45) Date of Patent: Sep. 19, 2023

(54) AUTOMATIC TRANSITION OF MOTOR CONTROLLER FROM OPEN-LOOP CONTROL TO CLOSED-LOOP CONTROL

(71) Applicant: Texas Instruments Incorporated, Dallas, TX (US)

(72) Inventors: Prasad Kulkarni, Bengaluru (IN); Venkata Pavan Mahankali, Bengaluru (IN); Ganapathi Hegde, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/364,540

(22) Filed: Jun. 30, 2021

(65) Prior Publication Data
US 2023/0006576 A1     Jan. 5, 2023

(51) Int. Cl.
*H02P 21/00*     (2016.01)
*H02P 6/182*     (2016.01)
(Continued)

(52) U.S. Cl.
CPC .......... *H02P 6/182* (2013.01); *H02P 21/0003* (2013.01); *H02P 21/10* (2013.01);
(Continued)

(58) Field of Classification Search
CPC .. H02P 6/182; H02P 21/18; H02P 6/21; H02P 21/22; H02P 21/003; H02P 21/10; H02P 27/06; H02P 2203/03
See application file for complete search history.

(56) References Cited

U.S. PATENT DOCUMENTS 10,000,234 B2    6/2018 Kim
2003/0175018 A1  9/2003 Heydt et al.
(Continued)

FOREIGN PATENT DOCUMENTS

CN    110350835 A  * 10/2019  .......... H02P 21/0003
DE    102021110124 A1 * 10/2021  ............ B60L 3/0038
(Continued)

OTHER PUBLICATIONS

Bist, Vashist; "Field Oriented Control (FOC) Made Easy for Brushless DC (BLDC) Motors using TI Smart Gate Drivers"; Application Brief; Texas Instruments; Jan. 2018; SLVA939B.
(Continued)

*Primary Examiner* — Karen Masih
(74) *Attorney, Agent, or Firm* — Valerie M. Davis; Frank D. Cimino (57) ABSTRACT

A motor controller integrated circuit (IC) includes a storage device containing software, and a processor core. The processor core has an output adapted to be coupled to a motor. The processor core is configured to execute the software to operate the motor in an open-loop control, calculate first and second orthogonal components of a back electromotive force (BEMF), calculate a total BEMF value, and determine that the first orthogonal component is within a threshold of the total BEMF value. The processor core is further configured to, responsive to the first orthogonal component being within the threshold of the total BEMF value, operate the motor in a closed-loop control.

26 Claims, 6 Drawing Sheets

(51) Int. Cl.
*H02P 21/10* (2016.01)
*H02P 21/18* (2016.01)
*H02P 21/22* (2016.01)
*H02P 27/06* (2006.01)

(52) U.S. Cl.
CPC .............. *H02P 21/18* (2016.02); *H02P 21/22* (2016.02); *H02P 27/06* (2013.01); *H02P 2203/03* (2013.01)

(56) References Cited

U.S. PATENT DOCUMENTS

| | | |
|---|---|---|
| 2005/0140329 A1 | 6/2005 | Ihm |
| 2008/0114515 A1 | 5/2008 | Hara |
| 2011/0074327 A1 | 3/2011 | Paintz et al. |
| 2012/0268052 A1 | 10/2012 | Nam et al. |
| 2014/0062364 A1 | 3/2014 | Petri et al. |
| 2015/0372629 A1 | 12/2015 | Huang et al. |
| 2016/0056740 A1* | 2/2016 | Nondahl ................ H02P 6/182 318/400.11 |
| 2016/0156297 A1 | 6/2016 | Takase et al. |
| 2017/0063271 A1 | 3/2017 | Murata |
| 2017/0225979 A1 | 8/2017 | Nicholas et al. |
| 2018/0234043 A1 | 8/2018 | Hustedt et al. |
| 2019/0386592 A1 | 12/2019 | Mogensen |
| 2021/0211079 A1* | 7/2021 | Jian ........................ H02P 27/12 |

FOREIGN PATENT DOCUMENTS

| | | |
|---|---|---|
| DE | 102021110124 A1 | 10/2021 |
| EP | 1998435 B1 | 7/2013 |
| EP | 2770636 A1 | 8/2014 |
| JP | 2008220155 A | 9/2008 |
| KR | 1020080085541 A | 9/2008 |
| KR | 101635551 B1 | 7/2016 |

OTHER PUBLICATIONS

Nfineon; "Sensorless Field Oriented Control with Embedded Power SoC"; Application Note, Mar. 9, 2020; Z8F68474109.

Akin, Bilal et al.; "Sensorless Field Oriented Control of 3-Phase Permanent Magnet Synchronous Motors"; Texas Instruments; C2000 Systems and Applications Team; Mar. 2011; SPRABY9.

Texas Instruments; "Low-Voltage, 50-A Sensorless FOC for Brushless DC or Permanent-Magnet Synchronous Motors Reference Design"; TI Designs TIDM-1003; Jun. 2017; TIDUD29.

Frick, Charles; "Brushless DC Motors Introduction for Next-Generation Missile Actuation Systems Outline"; Analog Devices, Inc .; 2018.

International Search Report in corresponding PCT Application No. PCT/US2022/035204, dated Oct. 21, 2022 (3 pages).

International Search Report in corresponding PCT Application No. PCT/US2022/035460, dated Oct. 26, 2022 (3 pages).

Torres, Daniel et al. "Regenerative Braking of BLDC Motors"; Microchip, Dec. 3, 2010. pp. 21.

* cited by examiner

AUTOMATIC TRANSITION OF MOTOR CONTROLLER FROM OPEN-LOOP CONTROL TO CLOSED-LOOP CONTROL

BACKGROUND

Many types and configurations of electric motors are available including, for example, direct current (DC) motors and alternating current (AC) motors. AC motors are available in various types as well including, for example, three-phase motors. A three-phase motor includes, for example, three pairs of stator windings. Three sinusoidal currents, one for each pair of stator windings, are generated by, for example, a DC-to-AC inverter. The three sinusoidal currents are 120 degrees out-of-phase with respect to each other. With reference to a first of the sinusoidal currents, a second current is 120 degrees out-of-phase, and a third current is 240 degrees out-of-phase with respect to the first of the sinusoidal currents.

SUMMARY

In one embodiment, a motor controller integrated circuit (IC) includes a storage device containing software, and a processor core. The processor core has an output adapted to be coupled to a motor. The processor core is configured to execute the software to operate the motor in an open-loop control, calculate first and second orthogonal components of a back electromotive force (BEMF), calculate a total BEMF value, and determine that the first orthogonal component is within a threshold of the total BEMF value. The processor core is further configured to, responsive to the first orthogonal component being within the threshold of the total BEMF value, operate the motor in a closed-loop control.

In another embodiment, a method of controlling a motor includes operating the motor with an open-loop control, calculating first and second orthogonal components of a back electromotive force (BEMF), calculating a total BEMF value, and determining that the first orthogonal component is within a threshold of the total BEMF value. Responsive to the first orthogonal component being within the threshold of the total BEMF value, the method includes operating the motor with a closed-loop control.

Reference is hereby made to co-pending patent application Ser. No. 17/358,147 (TI-92986) titled "Motor Controller Including Resonant Controllers", which is hereby incorporated by reference in its entirety.

BRIEF DESCRIPTION OF THE DRAWINGS

For a detailed description of various examples, reference will now be made to the accompanying drawings in which.

The same reference numbers and/or reference designators are used below to designate the same or similar (functionally and/or structurally) features.

DETAILED DESCRIPTION

The embodiments described herein pertain to a motor controller for a sensor-less motor. A sensor-less motor has no sensor for, for example, measuring motor speed or rotor position. Instead, based on motor current, the controller estimates motor speed and rotor position and uses those estimated values in a closed-loop to control the magnitude of the current to the motor and thus the speed of the motor. The motor controller includes a speed and position estimator that estimates motor speed and rotor position. However, at initial start-up of the motor, until the motor speed becomes large enough, the estimated values of speed and position are not accurate enough to use in the closed-loop control of the motor. Accordingly, the motor controller initializes in an open-loop control of the motor in which pre-determined values representing motor speed and rotor position are provided for controlling the motor.

The described embodiments are directed to techniques for an automatic change-over from open-loop control to closed-loop control of the motor. In one implementation, an auto-handoff controller repeatedly computes back electromotive force (BEMF) in, for example, a rotating reference frame and determines when a vector component of the computed BEMF (e.g., the component along the q-axis of a rotating d-axis/q-axis reference frame) is within a threshold of the total BEMF. When the computed BEMF component is within the threshold of the total BEMF, the auto-handoff controller switches the motor controller from open-loop to closed-loop control of the motor. The motor control technique described herein is a field-oriented control (FOC) technique for a three-phase sensor-less motor (e.g., a permanent magnet synchronous motor or an induction motor). The FOC control technique described herein also is applicable to single phase and three-phase grid synchronized inverters.

Figure 1:
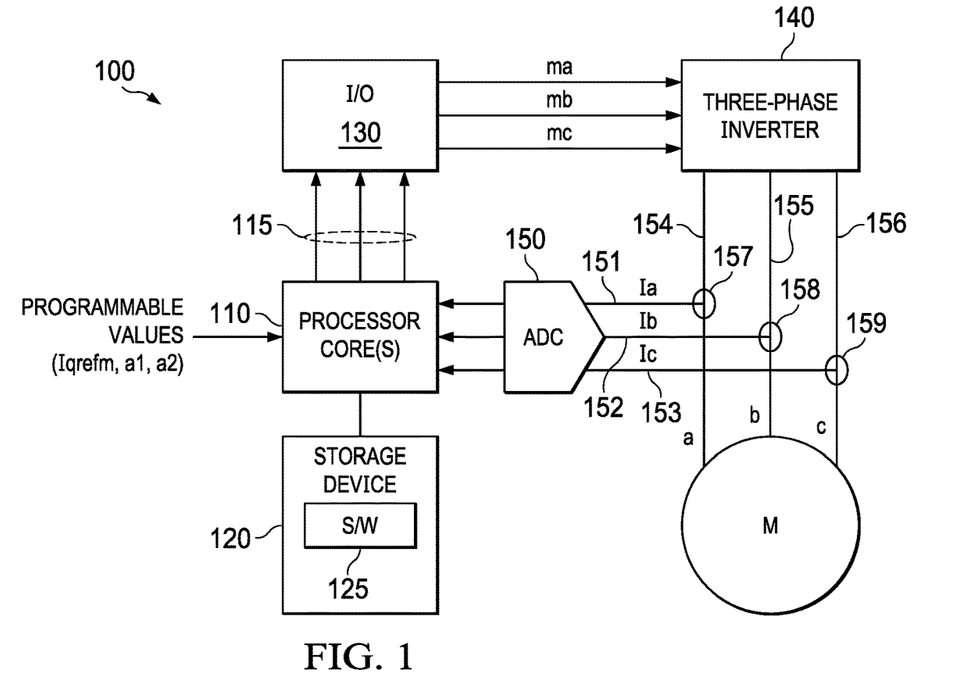
FIG. 1 is a block diagram of a motor and a system for controlling the motor in accordance with an example.

FIG. 1 is a block diagram of a three-phase motor system 100. The motor system 100 includes a processor core 110, a storage device 120, an input/output (I/O) interface 130, an analog-to-digital converter (ADC) 150, a three-phase inverter 140, and a motor M. The processor core 110 is coupled to the storage device 120 and executes software 125 stored in the storage device 120. Storage device 120 is a non-transitory storage device such as volatile memory (e.g., random access memory) or non-volatile memory (e.g., read-only memory), or combinations thereof. While a single processor core 110 is shown in FIG. 1, other embodiments include multiple processor cores that collectively execute the software 125. The processor core 110 implements the functionality described herein upon execution of software 125. Programmable values may be provided to the processor core 110 (e.g., through storage in storage device 120 and retrieval by the processor core 110) via any suitable type of interface (e.g., Inter-Integrated Circuit (IIC) or I2C). The type and use of the programmable values is described below regarding FIG. 5. The motor M includes three phases a, b, and c, and each phase has a pair of stator windings that receives a sinusoidal, or approximately sinusoidal, current from the three-phase inverter 140. Phases a, b, and c receive sinusoidal currents 154, 155, and 156, respectively, from the three-phase inverter 140.

The I/O interface 130 and the ADC 150 also are coupled to the processor core 110. The processor core 110 generates control signals on signal lines 115 that the I/O interface 130 outputs to the three-phase inverter 140 as signals ma, mb, and mc. The I/O interface 130 may include buffers to drive signals ma, mb, and mc to the three-phase inverter 140. As explained below, the three-phase inverter 140 includes a pair of transistor switches (a high side transistor coupled to a low side transistor at a switch node) for each of the three phases a, b, and c. Each of the signals ma, mb, and mc from the processor core 110 is used by the inverter 140 to implement the duty cycle for the respective high side and low side transistors. The duty cycle for the high side transistor is $$\frac{1+m}{2},$$

where m is the respective value of ma, mb, or mc. The duty cycle for the corresponding low side transistor is $$1 - \frac{1+m}{2}.$$

The values or m (and thus the duty cycle values) are varied sinusoidally by the processor core 110. By varying the duty cycles of each pair of transistors over time in a sinusoidal fashion for each phase, a sinusoidal current for that phase is generated.

The ADC 150 receives analog signals Ia 151, Ib 152, and Ic 153 from current sensors 157, 158, and 159, respectively. Analog signals Ia, Ib, and Ic represent (e.g., are directly proportional to) the instantaneous currents 154, 155, and 156 of the three phases a, b, and c, respectively. In one example, each of analog signals Ia, Ib, and Ic is a voltage proportional to the instantaneous magnitude of its respective phase current 154-156.

In one embodiment, the processor core 110, storage device 120, I/O interface 130, and ADC 140 are fabricated on the same integrated circuit (IC) (e.g. on a single semiconductor die or multiple semiconductor dies that are interconnected within a IC package). In another embodiment, the storage device 120 may be fabricated on an IC separate from the IC that includes the processor core 110, I/O interface 130, inverter 140, and ADC 150. In general, any two or more of the processor cores 110, storage device 120, I/O interface 130, inverter 140, and ADC 150 can be fabricated on the same IC. In another embodiment, the three-phase inverter 140 may be implemented on the same semiconductor die as the other circuit elements or can be fabricated on a separate semiconductor die but incorporated into the same IC package/module as the other circuit structures.

In one example, the processor core 110, upon execution of software 125, implements a field-oriented control (FOC) technique for controlling the operation of motor M. The FOC technique described below separately controls the torque and magnetic flux components of the motor's stator current.

Figure 2:
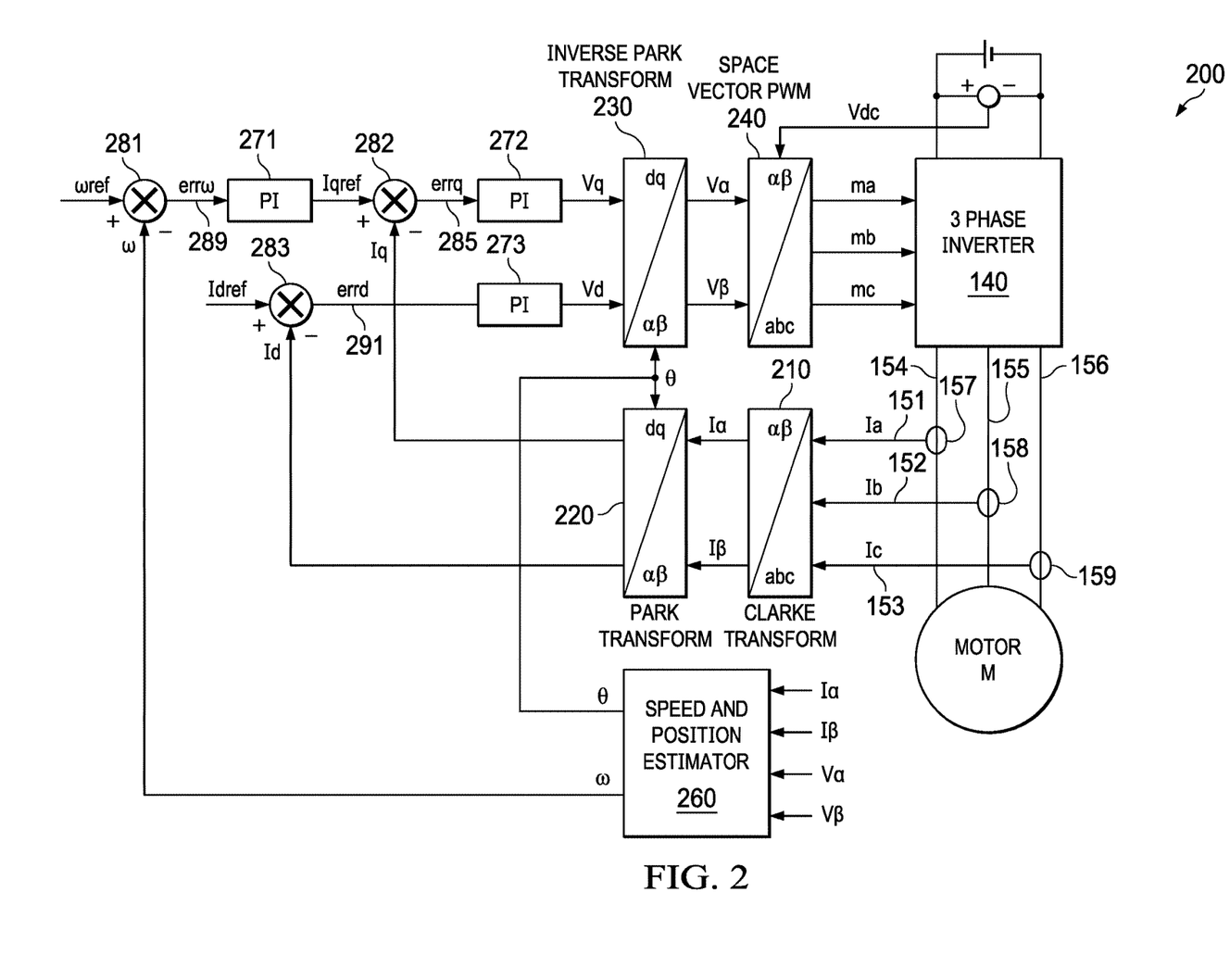
FIG. 2 is a functional block diagram of a field-oriented control (FOC) technique for controlling the motor in accordance with an example.

FIG. 2 is a functional block diagram 200 of the software 125 for implementing a closed-loop FOC technique. In alternative embodiments, the functional blocks included in FIG. 2 may be implemented using any combination of circuitry (e.g. processors, microprocessors, microcontrollers, state machines, ADC, DAC, flip-flops, registers, logic gates, and/or other types of logic circuits) and/or software. The block diagram of FIG. 2 includes a Clarke transform 210, a Park transform 220, an inverse Park transform 230, and a space vector pulse width modulator (PWM) 240. The space vector PWM 240 includes an inverse Clarke transform. The block diagram 200 further includes a speed and position estimator 260, proportional integral (PI) controllers 271, 272, and 273, and subtractors 281, 282, and 283. The digital values from ADC 150 (ADC 150 is not shown in FIG. 2) corresponding to analog signals Ia, Ib, and Ic are provided as inputs to the Clarke transform 210. In some embodiments, two of the three analog signals Ia-Ic (their digital equivalents) are used by the Clarke transform 210, as explained below. Each of the current sensors 157-159 may be implemented as a sense resistor included within each of the inverter's three phases. Each phase may include a high side and low side transistor pair. The sense resistors may be coupled to the low side transistor within the respective phase. Current flows through the sense resistor only when the respective low side transistor is on. Because the low side switch and its high side transistor counterpart are reciprocally turned on and off at a sinusoidally varying duty cycle (explained below), the low side transistor is off during a portion of each switching period. When the low side transistor is off, no current flows through the sense resistor and thus that phase's sense current signal (Ia-Ic) is not available for use by the Clarke transform. Accordingly, two of the sense current signals are used by the Clarke transform, with the selection varying as to which two sense current signals are to be used at any point in time.

The Clarke transform 210 projects the three-phase system (Ia, Ib, Ic) into a two-dimensional ($\alpha$, $\beta$) orthogonal system. The Clarke transform 210 implements the following equations to convert two of Ia, Ib and Ic to I$\alpha$ and I$\beta$. Currents Ia and Ib are assumed to be the two selected currents in Eq. (1), but in general, Eq. (1) uses any two of the three currents Ia, Ib, and Ic.

$$\begin{cases} I\alpha = Ia \\ I\beta = \frac{1}{\sqrt{3}} * Ia + \frac{2}{\sqrt{3}} * Ib \end{cases} \quad (1)$$

Figure 3:
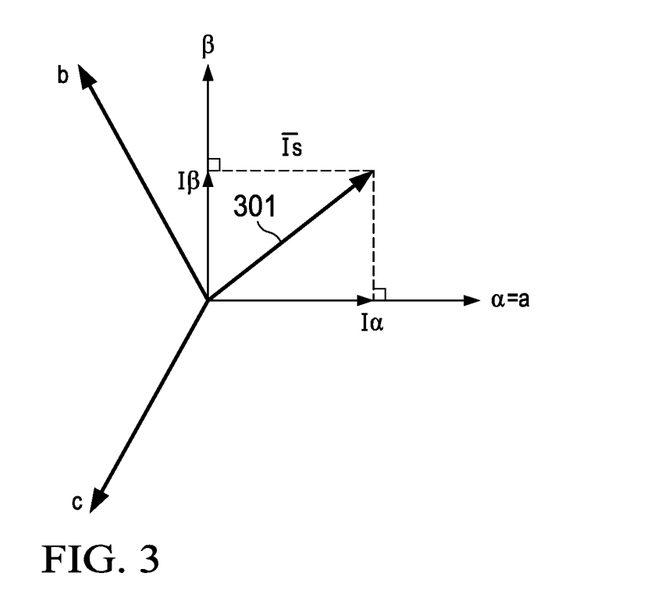
FIG. 3 is a vector diagram illustrating the relationship between the time-domain motor sense currents and an orthogonal reference implemented by the Clarke transformation.

FIG. 3 shows the relationship between the three-phase a, b, c coordinate system and the two-dimensional ($\alpha$, $\beta$) orthogonal system. Currents Ia-Ic are 120 degrees out of phase with respect to each other and are on the respective a, b and c axes in FIG. 3. Current vector Ia is in-line with the a-axis (the a and $\alpha$-axes are colinear) and current vector 1$\beta$ is along the $\beta$-axis. The $\beta$-axis is orthogonal to the $\alpha$-axis. Vector 301 is the complex stator current vector (Is) which is the vector sum of I$\alpha$ and I$\beta$ and thus is a mathematical combination (per Eq. (1)) of the motor's current signals Ia and Ib.

Figure 4:
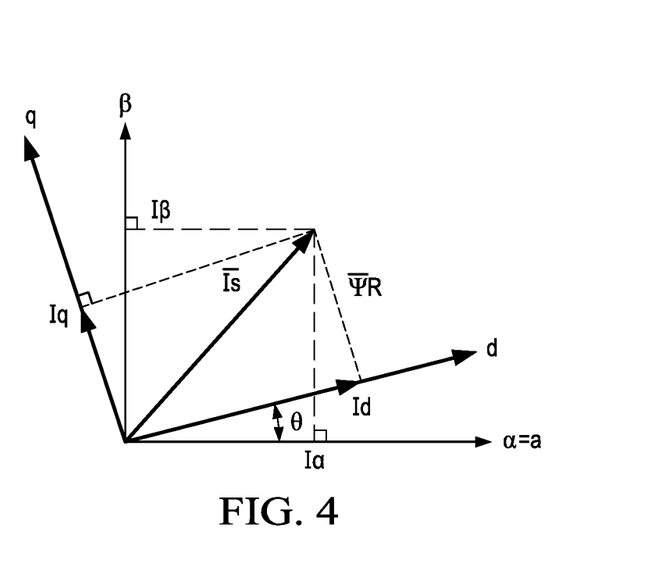
FIG. 4 is a vector diagram illustrating the relationship between the orthogonal reference implemented by the Clarke transformation and a rotating reference frame implemented by the Park transformation.

The Clarke transform 210 outputs Ia and I$\beta$ as inputs to the Park transform 220. The Park transform 220 projects the ($\alpha$, $\beta$) orthogonal system onto a rotating reference frame (d,q) as shown in FIG. 4. The rotating reference frame is a reference frame that spins at a constant angular speed, which may or may not be same as the speed of the rotor. For permanent magnet synchronous motors, for example, the speed of the rotating reference frame is the same as rotor speed and the d-axis of the rotating reference frame aligns with the d-axis of the rotor (e.g. the axis extending from the south pole of the magnet to the north pole of the magnet). Accordingly, the d-axis of the rotating reference frame is aligned with the rotor's flux. The angle $\theta$ between the $\alpha$-axis and the d-axis is the rotor flux position. In closed-loop control, the rotor flux position $\theta$ is computed by the speed and position estimator 260 and is provided to the Park transform 220. The q-axis is aligned with rotor torque. Based on Ia and I$\beta$, in one embodiment, the Park transform 220 computes the flux (Id) and torque (Iq) components in the (d,q) domain as follows:

$$\begin{cases} Id = I\alpha * \cos(\theta) + I\beta * \sin(\theta) \\ Iq = -I\alpha * \sin(\theta) + I\beta * \cos(\theta) \end{cases} \quad (2)$$

The flux component Id and the torque component Iq are the outputs of the Park transform 220 and depend on the current vector components (I$\alpha$, I$\beta$) and on the rotor flux position $\theta$. Per the FOC control technique, processor core 110 controls the flux current component (Id) and the torque current component (Iq) independently.

The speed and position estimator 260 receives as inputs the outputs I$\alpha$ and I$\beta$ from the Clarke transform 210, as well as signals V$\alpha$ and V$\beta$ which are output values from the inverse Park transform 230. Using the values of I$\alpha$, I$\beta$, V$\alpha$, and V$\beta$, the speed and position estimator 260 computes the back electromotive force (BEMF), and then using the computed BEMF, computes rotor speed w and flux position $\theta$. In one embodiment, the speed and position estimator 260 computes the BEMF in the $\alpha$, $\beta$ reference frame $$\left(\begin{bmatrix} E\alpha \\ E\beta \end{bmatrix}\right)$$

using the following equation:

$$\begin{bmatrix} E\alpha \\ E\beta \end{bmatrix} = \begin{bmatrix} V\alpha \\ V\beta \end{bmatrix} - \left(rs * \begin{bmatrix} I\alpha \\ I\beta \end{bmatrix}\right) - \frac{d}{dt}\left(\begin{bmatrix} L\alpha\alpha & L\alpha\beta \\ L\beta\alpha & L\beta\beta \end{bmatrix} * \begin{bmatrix} I\alpha \\ I\beta \end{bmatrix}\right) \quad (3)$$

where rs is the motor's resistance and $$\begin{bmatrix} L\alpha\alpha & L\alpha\beta \\ L\beta\alpha & L\beta\beta \end{bmatrix} = \begin{bmatrix} L0 + L1 * \cos(2\theta) & L1 * \sin(2\theta) \\ L1 * \sin(2\theta) & L0 - L1 * \cos(2\theta) \end{bmatrix}.$$

The inductance value $$L0 = \frac{Ld + Lq}{2}$$

and $$L1 = \frac{Ld - Lq}{2},$$

where Ld and Lq are the d- and q-axis inductances, respectively. The speed and position estimator computes rotor position $\theta$, but the preceding equation for computing $$\begin{bmatrix} L\alpha\alpha & L\alpha\beta \\ L\beta\alpha & L\beta\beta \end{bmatrix}$$

uses rotor position $\theta$. The assumption is that the motor's inductance does not appreciably change very quickly (e.g., within one sampling instance) and thus the rotor position $\theta$ previously computed by the speed and position estimator 260 is used to compute the current value of motor inductance $$\begin{bmatrix} L\alpha \\ L\beta \end{bmatrix}.$$

In one embodiment, the speed and position estimator 260 then computes the BEMF in the d,q rotating reference frame (Ed and Eq, respectively) based on the BEMF in the $\alpha$, $\beta$ reference frame and then computes rotor speed $\omega$ and position $\theta$ as provided in equations 4-6.

$$\begin{bmatrix} Ed \\ Eq \end{bmatrix} = \begin{bmatrix} \cos(\theta) & \sin(\theta) \\ -\sin(\theta) & \cos(\theta) \end{bmatrix} * \begin{bmatrix} E\alpha \\ E\beta \end{bmatrix} \quad (4)$$

$$\omega = \frac{1}{Ke} * (Eq - \text{sgn}(\omega) * Ed) \quad (5)$$

$$\theta = \int \omega * dt \quad (6)$$

The subtractor 281 subtracts the rotor speed $\omega$ from a reference speed value $\omega$ref (the target speed for the motor and generated by the processor core 110) to produce an error value err$\omega$ 289. The error value err$\omega$ 289 is an input to the PI controller 271. In some example embodiments, the PI controllers 271, 272 and 273 are control loop software modules that employ feedback, and in other example embodiments these PI controllers are implemented in hardware. In general, a PI controller repeatedly receives an error value that is the difference between a desired setpoint (e.g., reference speed value $\omega$ref in the case of PI controller 271) and a measured process variable (e.g., rotor speed $\omega$), and generates an adjustment for another process variable based on proportional and integral terms. For example, in the case of the PI controller 271, the generated adjustment is Igref. Subtractor 282 subtracts Iq from Igref to generate output value errq 285. The PI controllers 271-273 are digital controllers that implement the following equation:

$$u(t) = Kp + Ki/s \quad (7)$$

where u(t) is the ratio of the output value to the input value (e.g., an error value) from a PI controller, Kp is a proportional gain, Ki is an integral gain, "s" is the Laplace variable. A PI controller includes a proportional component and an integral component. The proportional component operates on the present value of the error while the integral component operates on previous error values. The proportional component ensures that the steady state error becomes small, but generally cannot ensure the error to be zero. However, because it operates on present error values, the proportional component converges relatively quickly. The integral component ensures that steady state error becomes zero. However, because it operates on previous values of error (error history), it converges more slowly than the proportional component. In general, the proportional component of a PI controller reduces the error to a relatively low value, and the integral component further reduces the error to zero. The speed at which the PI controller converges and any overshoot or undershoot observed are determined by the values of the proportional gain (Kp) and the integral gain (Ki).

The outputs from the Park transform 220, Id and Iq, are flux and torque current values, respectively, in the d,q rotating reference frame. The Iq component from the Park transform is subtracted from the Idref value by subtractor 282 to produce an error value errq 285. The PI controller 272 processes the value errq to compute the voltage value Vq in the (d,q) rotating reference frame. Subtractor 283 subtracts Id from a flux reference value Idref to compute a flux error value errd 291. PI controller 273 receives error value errd 291 and outputs a voltage value Vd. The voltages Vq and Vd are the q-axis and d-axis voltages, respectively, applied to the motor so that the q-axis and d-axis currents match their respective references.

The inverse Park transform 230 transforms the rotating frame flux and torque values Vd and Vq, respectively, into the corresponding values of Vα and Vβ in the (α, β) stationary orthogonal reference frame. The rotor flux position θ from the speed and position estimator 260 is also provided to the inverse Park transform 230. In one example, the Park transform computes Vα and Vβ as:

$$V\alpha = Vd*cos(\theta) - Vq*sin(\theta)$$

$$V\beta = Vd*sin(\theta) + Vq*cos(\theta) \quad (8)$$

The values Vα and Vβ are then provided to the space vector PWM 240 which uses the values Vα and Vβ to produce the signals ma, mb, and mc that drive the three-phase inverter 140. The inverter 140 converts the voltage reference values (ma, mb, mc) to duty cycles that control the on and off states of the transistors within the respective inverter phase such that the voltage on the phase's switch node applied to the motor has an average voltage that is approximately the same as the voltage reference value (ma, mb, mc). The relationship between ma-mc and the respective duty cycle is provided above.

Figure 5:
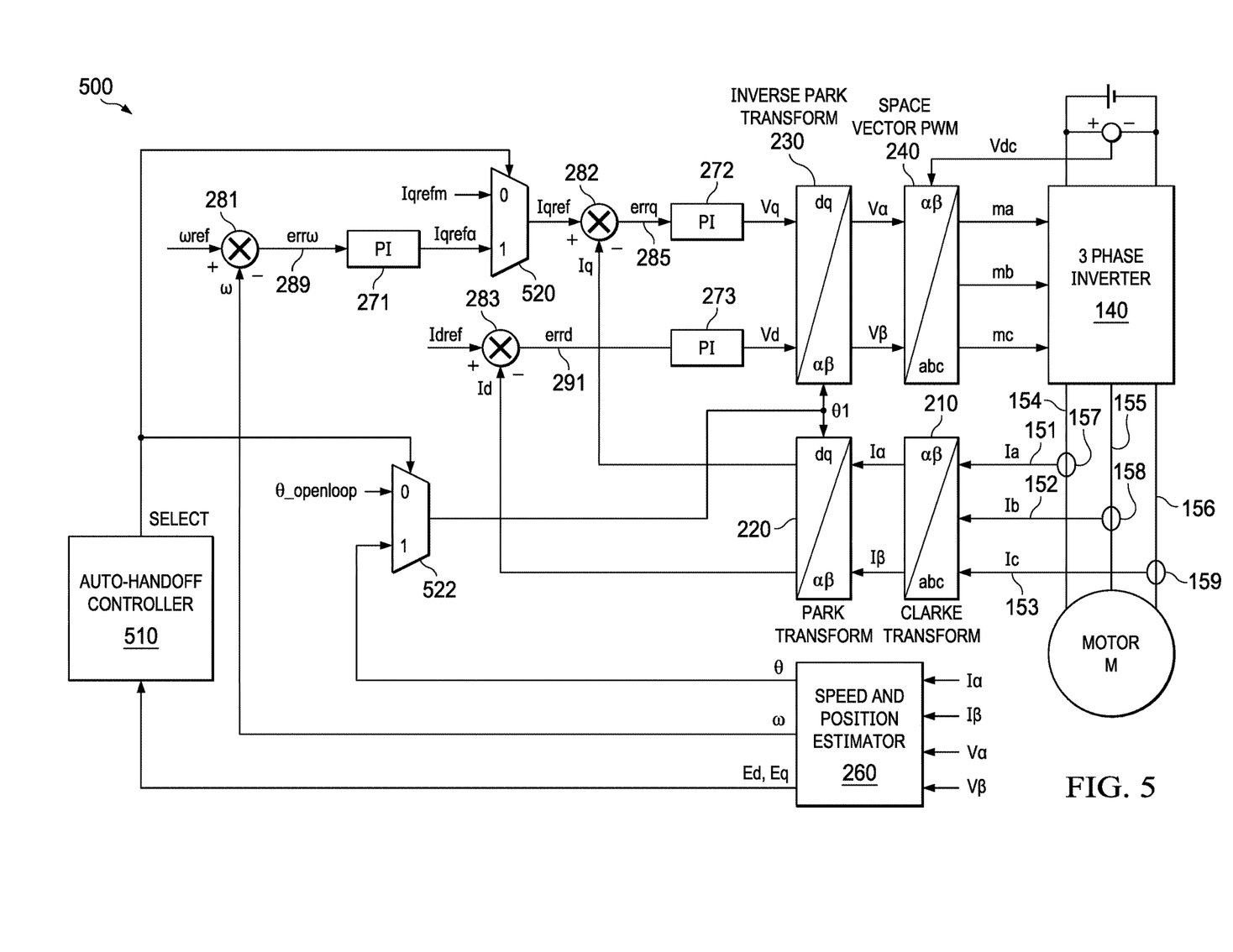
FIG. 5 is a functional block diagram of an FOC technique for controlling the motor and including an auto-handoff controller to switch motor control from open-loop control to closed-loop control in accordance with an example

As explained above, the values of speed (ω) and rotor position (θ) computed by the speed and position estimator 260 are not necessarily accurate at motor start-up because speed and position is determined from BEMF, and BEMF has relatively poor (low) signal-to-noise ratio (SNR) at low motor speeds. FIG. 5 is a functional block diagram 500 of the software 125 for implementing an FOC technique that includes both open-loop and closed-loop modes of operation. Some of the functional blocks in FIG. 5 are the same as those shown in FIG. 2 and the description of those blocks is not repeated with regard to the description of FIG. 5. While the example embodiments of FIGS. 1, 2 and 5, refer to software 125 and the implementation of some features in software, other example embodiments may implement the same features in hardware, software or a combination of hardware and software.

In addition to the functional blocks from FIG. 2, the functional block diagram 500 includes an auto-handoff controller 510 and multiplexers 520 and 522. The auto-handoff controller 510 receives as an input the d- and q-axis estimates of BEMF (Ed and Eq) computed by the speed and position estimator 260. As explained below, based on the BEMF values Ed and Eq, the auto-handoff controller 510 generates a select signal (SELECT), which is the control signal for multiplexers 520 and 522.

Multiplexer 520 has a first input (e.g. a 0-input) and a second input (e.g. a 1-input). The select signal SELECT indicates which of the two inputs is to provide its signal to the output. The output signal is Iqref, described above with reference to the input of subtractor 282. The 0-input receives a value labeled Iqrefm, which is one of the programmable values provided to the processor core 110 (FIG. 1). An external device (not shown) can transmit the value of Iqrefm to the processor core 110. During open-loop operation, the SELECT signal is set to a first logic state (e.g., "0") to cause the 0-input of the multiplexer 520 to be selected. The output from the PI controller 271 in FIG. 5 is shown as Iqrefa. During closed-loop operation, the SELECT signal is set to a second logic state (e.g., "1") to cause the 1-input of the multiplexer 520 to be selected. During open-loop operation, Iqref is equal to Iqrefm. During closed-loop operation, Iqref is equal to Irefa from the PI controller 271.

Multiplexer 522 also has a 0-input and a 1-input. The estimated value of rotor position from the speed and position estimator 260 is provided to the 1-input. The 0-input of multiplexer 522 is a calculated value θ_openloop. The open loop value of rotor position (θ_openloop) is calculated based on programmable values and not based on motor current. The programmable values for computing θ_openloop include rotor acceleration values a1 and a2. The processor core 110 computes motor speed (FREQ) during open loop operation as:

$$FREQ = (a1*t) + a2*t^2 \text{ tm (9)}$$

where "t" is time measured starting from the time the motor begins to spin (i.e., time spent during open-loop operation) . The processor core 110 integrates FREQ to compute the open loop value θ_openloop as:

$$\theta\_openloop = \int (FREQ) dt \quad (10)$$

The select signal SELECT form the auto-handoff controller 510 causes the multiplexer 522 to select between its 0-input and its 1-input. During open loop operation, the auto-handoff controller 510 asserts SELECT to the first logic state to cause multiplexer 522 to provide θ_openloop as its output (shown in FIG. 5 as θ1) to the Park transform 220 and the inverse Park transform 230. The θ inputs to the Park and inverse Park transforms described above are replaced with θ1 in the embodiment of FIG. 5.

The auto-handoff controller 510 automatically (without using externally-provided parameters) determines when to switch control from open-loop to closed-loop control. The determination of when to switch from open-loop to closed-loop control is implemented by the auto-handoff controller 510 based on the calculation of BEMF from Eq. 4 above. The calculation of BEMF produces BEMF components in the d and q-axes. The value Ed is the component of BEMF along the d-axis, and the value Eq is the component of BEMF along the q-axis. The total BEMF is the sum of the Ed and Eq components (vector addition).

Figure 6:
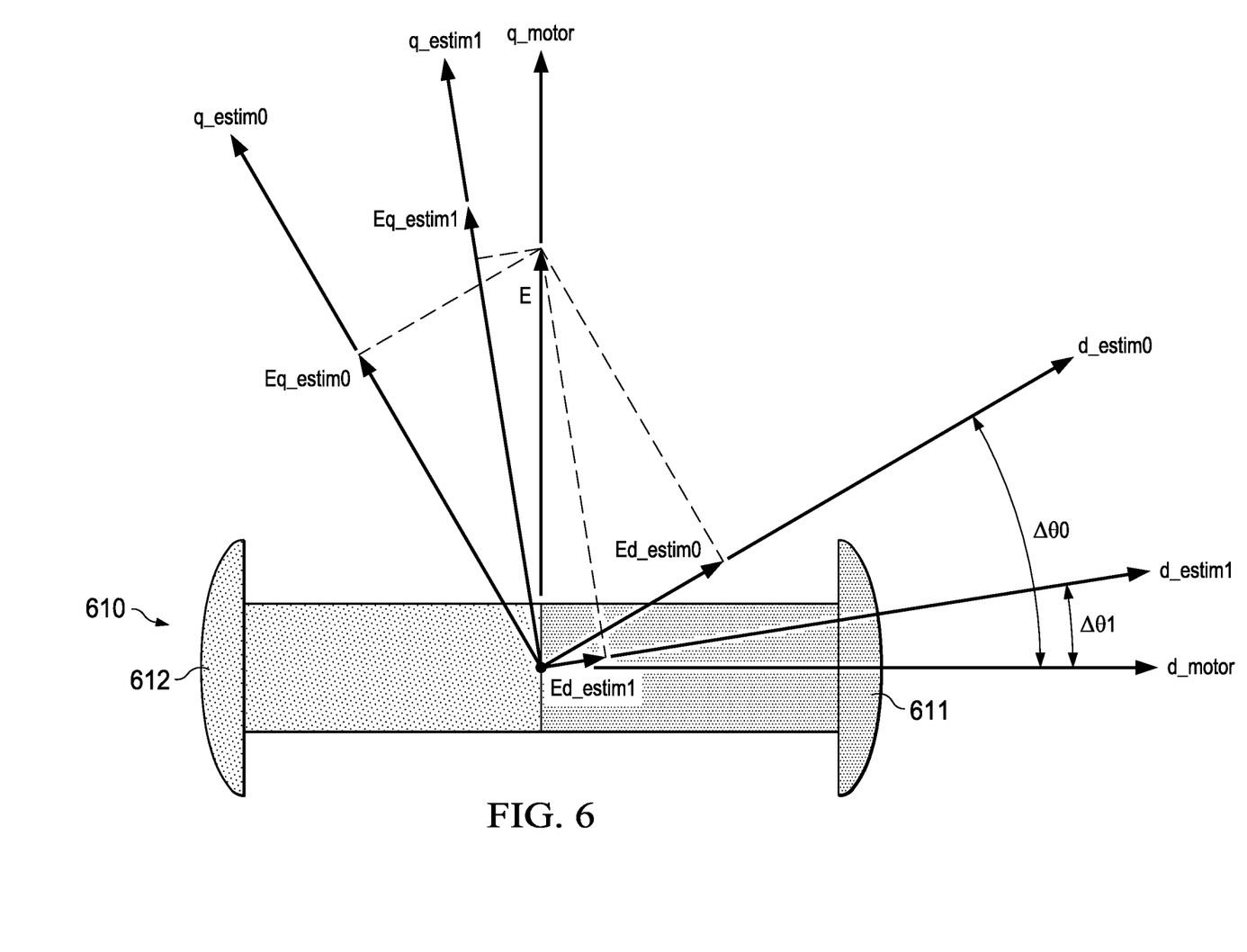
FIG. 6 is a vector diagram showing multiple estimates of back electromotive force (BEMF) and their use by the auto-handoff controller to determine when to switch operation from open-loop to closed-loop control in accordance with an example.

FIG. 6 illustrates multiple BEMF estimates in the d,q rotating reference frame for a rotor 610. The rotor has a north pole 611 and a south pole 612. The d,q rotating reference frame generally rotates at rotor speed and thus the rotor is stationary with respect to the rotating reference frame. Two estimates for BEMF are shown. The rotor flux position θ takes a finite amount of time to lock to the rotor and thus one of the estimates (Estimate 0 and Estimate 1) is likely closer to the actual angular position of the rotor than the other estimate. The determination below is an example of how the processor core 110 determines an estimate to be within a threshold range of the actual rotor position. Estimate 0 includes Ed and Eq components shown as Ed_estim0 and Eq_estim0, respectively. Estimate 1 includes Ed and Eq components shown as Ed_estim1 and Eq_estim1. Each of the vector sum of Ed_estim0 and Eq_estim0 and the vector sum of Ed_estim1 and Eq_estim1 is the total BEMF labeled as vector E in FIG. 6. For any pair of d- and q-axis components of a BEMF estimate (Ed, Eq) calculated by the speed and position estimator 260, the vector sum of the components is the same as for any other pair of d- and q-axis BEMF components.

In accordance with an example embodiment, the auto-handoff controller 510 computes the vector sum of the Ed and Eq BEMF components it receives from the speed and position estimator 260 and determines when the q-axis component (Eq) is within a threshold value of the total BEMF. In the example of FIG. 6, for estimate 1, the Eq_estim1 component is closer in magnitude to the total BEMF (E) compared to Eq_estim0 for estimate 0. In one example, the auto-handoff controller 510 applies a preset or programmable (via programmable values, FIG. 1) threshold. For example, the threshold may be 90% (0.9). As such, the auto-handoff controller 510 determines when the Eq component of a given BEMF estimate is at least 90% of the total BEMF. Before the auto-handoff controller 510 determines that the Eq component of a BEMF estimated has reached the threshold, the auto-handoff controller asserts the select signal SELECT to the first logic state which causes the multiplexers 520 and 522 to select their 0-input, thereby using the Irefm and θ_openloop values, respectively, in open-loop control of the motor. When the Eq component of a given BEMF estimate reaches or exceeds the threshold level (e.g., percentage of total BEMF), the auto-handoff controller 510 changes the select signal SELECT to the second logic state which causes the multiplexers 520 and 522 to select their 1-inputs (Irefa and θ, respectively) thereby implementing closed-loop control of the motor. In one embodiment, the auto-handoff controller 510 changes the select signal SELECT to the second logic to switch from open-loop to closed-loop control as long as the estimator is not within a threshold value of saturation. The determination as to whether the estimator is within a threshold value of saturation is implementation dependent, and ensures that the estimate of BEMF is a reliable value. For example, a BEMF threshold value may be programmed into the processor core 110 and/or stored in storage device 120. The auto-handoff controller 510 determines whether the estimate of BEMF is within a predetermined percentage of the programmed BEMF threshold value.

Figure 7:
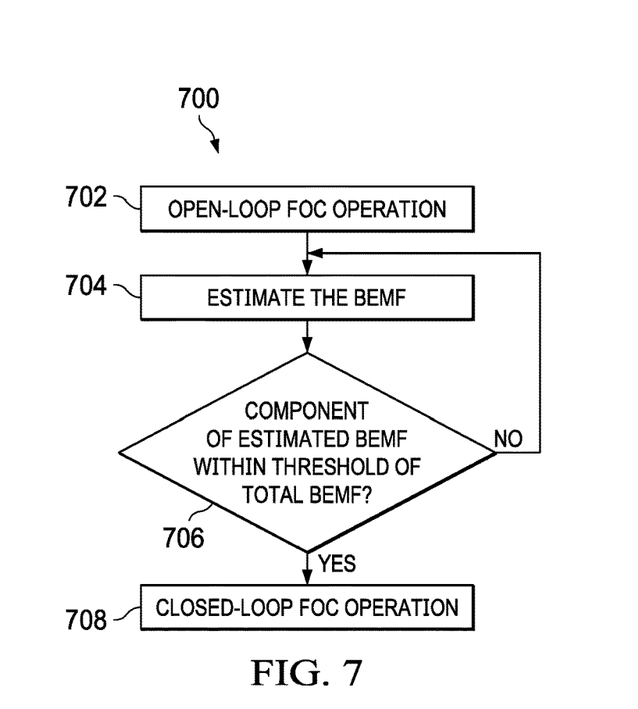
FIG. 7 is a flowchart illustrating a method for automatically changing motor control from open-loop control to closed-loop control in accordance with an example.

FIG. 7 is a flow chart 700 depicting an example method implemented by the motor controller 100. At step 702, the method includes operating the motor according to an open-loop FOC operation. This step, for example, may be implemented using predetermined or calculated values for FOC operation where the predetermined or calculated values are not derived from a measurement of motor current. Open-loop FOC operation may begin upon motor start-up (motor beginning to turn from a dead stop).

At 704, the method includes estimating the BEMF. In one example, the estimated BEMF includes first and second orthogonal components such as Ed and Eq in a d,q rotating reference frame. At 706, the method includes determining whether a component of the estimated BEMF is within a threshold of the total BEMF. In one example, the component is the q-axis component of the estimated BEMF and the total BEMF is the vector sum of the first and second orthogonal components of the estimated BEMF. The threshold may be, for example, a percentage of the total BEMF.

If the estimated BEMF component (e.g., Eq) is not within the threshold of the total BEMF, then control loops back to step 704, open-loop FOC operation continues and another BEMF estimate is computed. Open-loop FOC operation continues until the estimated component of BEMF reaches or exceeds the threshold, at which time the auto-handoff controller 510 changes motor operation to a closed-loop FOC control (708) in which motor current is measured and used to derive rotor speed and position as feedback values in the FOC technique.

Figure 8:
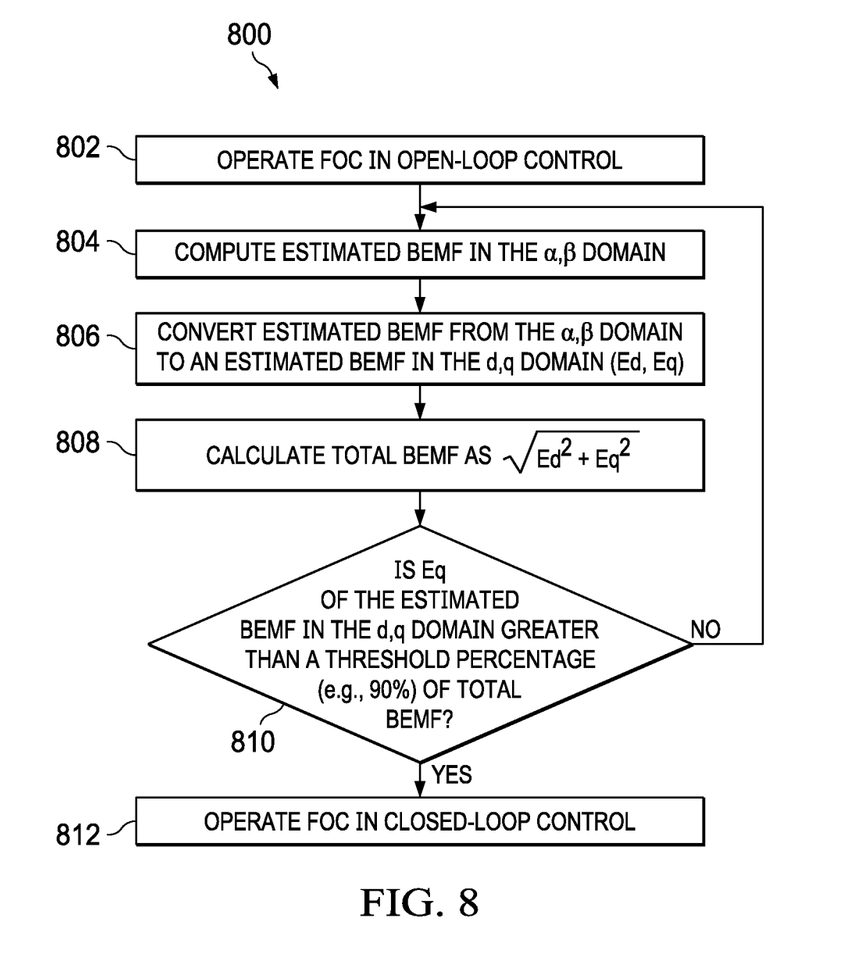
FIG. 8 is a flowchart illustrating another method for automatically changing motor control from open-loop control to closed-loop control in accordance with an example.

FIG. 8 is a flow chart 800 depicting another example method implemented by the motor controller 100. At step 802, the method includes operating the motor according to the open-loop FOC operation, as described above. At 804, the method includes computing an estimate of the BEMF in the α, β domain. Equation (3) above provides one possible embodiment for computing the BEMF in the α,β domain. At 806, the method includes converting the estimate of the BEMF in the α, β domain to an estimate of the BEMF in the d,q domain. The components of the BEMF in the d,q domain are Ed and Eq as explained above.

At 808, the method includes computing the total BEMF using the Ed and Eq components of the estimated BEMF in the d,q domain. The total BEMF is computed as a vector sum of Ed and Eq, and thus the magnitude of the total BEMF is the square root of the sum of the squares of the magnitudes of Ed and Eq. At 810, the method 800 includes determining whether the Eq component of the estimated BEMF in the d,q domain is within a threshold of the total BEMF. The threshold may be, for example, a percentage of the total BEMF. If the Eq component is not within the threshold of the total BEMF, then control loops back to step 804, open-loop FOC operation continues, and another BEMF estimate in the α, β domain is computed. Open-loop FOC operation continues until the Eq component of BEMF reaches or exceeds the threshold, at which time the auto-handoff controller 510 changes motor operation to a closed-loop FOC control (812) in which motor current is measured and used to derive rotor speed and position as feedback values in the FOC technique.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. As used herein, references to software functions or functional block diagrams may be implemented by software running on a processor, microcontroller or other type of processing device in conjunction with memory, in some example embodiments, or may be implemented using hardware (such as logic gates, processors, application specific integrated circuits, field programmable gate array and/or state machines), alone.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A motor controller integrated circuit (IC), comprising:
   a storage device containing software; and
   a processor core coupled to the storage device, the processor core configured to execute the software to:
      operate a motor in an open-loop control;
      calculate first and second orthogonal components of a back electromotive force (BEMF);
      calculate a total BEMF value;
      determine that the first orthogonal component is within a threshold of the total BEMF value; and
      responsive to the first orthogonal component being within the threshold of the total BEMF value, operate the motor in a closed-loop control.

2. The motor controller IC of claim 1, wherein the processor, upon executing the software, is configured to implement a field-oriented control (FOC) of the motor.

3. The motor controller IC of claim 2, wherein the first and second orthogonal components are BEMF components in a rotating reference frame.

4. The motor controller IC of claim 2, wherein the processor is configured to:
   implement first and second proportional integral (PI) controllers, the first PI controller having a PI controller output and the second PI controller having a PI controller input;
   during open-loop control operation, provide a predetermined value to the PI controller input; and
   during closed-loop control operation, provide the PI controller output from the first PI controller to the PI controller input of the second PI controller.

5. The motor controller IC of claim 4, wherein the processor is configured to:
   estimate a motor speed based on motor current; and
   implement the first PI controller to calculate the PI controller output using the estimated motor speed.

6. The motor controller IC of claim 2, wherein the processor is configured to:
   implement a Park transform having a Park transform input;
   estimate a motor speed based on motor current;
   during open-loop control operation, compute a first value of rotor position based on a predetermined acceleration value, and provide the first value of rotor position to the Park transform input; and
   during closed-loop control operation, compute a second value of rotor position based on the motor current, and provide the second value of rotor position to the Park transform input.

7. The motor controller IC of claim 1, wherein the processor is configured to calculate the total BEMF as a vector sum of the first and second orthogonal components.

8. The motor controller IC of claim 1, wherein the processor is configured to:
   compute estimates of rotor speed and position based on motor current; and
   during closed-loop control operation, control current to the motor based on the computed estimates of rotor speed and position.

9. The motor controller IC of claim 1, wherein the processor is configured to operate the motor as a three-phase motor.

10. A motor controller integrated circuit (IC), comprising:
    a three-phase inverter; and
    circuitry coupled to the three-phase inverter, the circuitry operable to:
       operate a motor in an open-loop field-oriented control (FOC);
       calculate first and second orthogonal components of a back electromotive force (BEMF) in a rotating reference frame;
       calculate a total BEMF value in the rotating reference frame;
       determine that the first orthogonal component is within a threshold of the total BEMF value; and
       responsive to the first orthogonal component being within a threshold of the total BEMF value, operate the motor in a closed-loop FOC control.

11. The motor controller IC of claim 10, wherein the processor is configured to:
    implement first and second proportional integral (PI) controllers, the first PI controller having a PI controller output and the second PI controller having a PI controller input;
    during open-loop control operation, provide a predetermined value to the PI controller input; and
    during closed-loop control operation, provide the PI controller output from the first PI controller to the PI controller input of the second PI controller.

12. The motor controller IC of claim 11, wherein the processor is configured to:
    estimate a motor speed based on motor current; and
    implement the first PI controller to calculate the PI controller output using the estimated motor speed.

13. The motor controller IC of claim 12, wherein the processor is configured to:
    implement a Park transform having a Park transform input;
    estimate a motor speed based on motor current;

during open-loop control operation, compute a first value of rotor position based on a predetermined acceleration value, and provide the first value of rotor position to the Park transform input; and during closed-loop control operation, compute a second value of rotor position based on the motor current, and provide the second value of rotor position to the Park transform input.

14. The motor controller IC of claim 10, wherein the processor is configured to calculate the total BEMF as a vector sum of the first and second orthogonal components.

15. The motor controller IC of claim 10, wherein the processor is configured to:

compute estimates of rotor speed and position based on motor current; and during closed-loop control operation, control current to the three-phase motor based on the computed estimates of rotor speed and position.

16. A method of controlling a motor, comprising:

operating the motor with an open-loop control;

calculating first and second orthogonal components of a back electromotive force (BEMF);

calculating a total BEMF value;

determining that the first orthogonal component is within a threshold of the total BEMF value; and responsive to the first orthogonal component being within the threshold of the total BEMF value, operating the motor with a closed-loop control.

17. The method of claim 16, wherein calculating the first and second orthogonal components comprise calculating the first and second orthogonal components in a rotating reference frame.

18. The method of claim 16, further comprising:

implementing first and second proportional integral (PI) controllers, the first PI controller having a PI controller output and the second PI controller having a PI controller input;

during open-loop control operation, providing a predetermined value to the PI controller input; and during closed-loop control operation, providing the PI controller output from the first PI controller to the PI controller input of the second PI controller.

19. The method of claim 18, further comprising:

estimating motor speed based on motor current; and implementing the first PI controller to calculate the PI controller output using the estimated motor speed.

20. The method of claim 16, further comprising:

implementing a Park transform having a Park transform input;

estimating motor speed based on motor current;

during open-loop control operation, computing a first value of rotor position based on a predetermined acceleration value, and providing the first value of rotor position to the Park transform input; and during closed-loop control operation, computing a second value of rotor position based on the motor current, and providing the second value of rotor position to the Park transform input.

21. The method of claim 16, wherein calculating the total BEMF comprises calculating the square root of the sum of the squares of the magnitudes of the first and second orthogonal components.

22. The method of claim 16, further comprising:

computing estimates of rotor speed and position based on motor current; and during closed-loop control operation, controlling current to the motor based on the computed estimates of rotor speed and position.

23. A motor controller integrated circuit (IC), comprising:

a storage device containing software; and a processor core coupled to the storage device, the processor core configured to execute the software to:

operate a motor in an open-loop control;

calculate q-axis and d-axis components of a back electromotive force (BEMF);

calculate a total BEMF value;

determine that the q-axis component is within a threshold of the total BEMF value;

and responsive to the q-axis component being within the threshold of the total BEMF value, operate the motor in a closed-loop control.

24. The motor controller IC of claim 1, wherein the first orthogonal component is a q-axis component, and the second orthogonal component is a d-axis component.

25. The motor controller IC of claim 10, wherein the first orthogonal component is a q-axis component, and the second orthogonal component is a d-axis component.

26. The method of claim 16, wherein the first orthogonal component is a q-axis component, and the second orthogonal component is a d-axis component.

* * * * *